United States Patent [19]

Thomas

[11] 4,446,679
[45] May 8, 1984

[54] LAWNMOWER POWERED IMPLEMENT

[76] Inventor: Perry W. Thomas, 12708 12th St., Grandview, Mo. 64030

[21] Appl. No.: 404,560

[22] Filed: Aug. 2, 1982

[51] Int. Cl.³ ............................................. A01D 53/08
[52] U.S. Cl. ........................................ 56/2; 56/16.9; 37/243
[58] Field of Search ............... 56/16.9, 16.7, 2, 16.8; 37/241, 242, 243

[56] References Cited

U.S. PATENT DOCUMENTS

| | | | |
|---|---|---|---|
| 3,151,563 | 10/1964 | Lita et al. | 56/16.8 |
| 3,402,668 | 9/1968 | Pusztay | 56/16.9 |
| 3,774,321 | 11/1973 | David | 37/243 |
| 3,813,190 | 5/1974 | Keating | 56/16.9 |
| 3,882,615 | 5/1975 | Williams | 37/243 |
| 3,946,543 | 2/1976 | Templeton | 56/16.9 |
| 4,367,572 | 1/1983 | Zielenski | 24/301 |

OTHER PUBLICATIONS

Roto-Hoe Pamplet, Copyright 1954.

*Primary Examiner*—Robert P. Swiatek
*Assistant Examiner*—David I. Tarnoff
*Attorney, Agent, or Firm*—Kokjer, Kircher, Bradley, Wharton, Bowman & Johnson

[57] ABSTRACT

A multipurpose, wheeled implement having a frame mounted platform configured to secure a lawnmower in proper disposition for utilizing the power from the lawnmower engine for driving rotary working tools carried by the implement frame. A projection of the implement frame is configured to receive thereover in telescoped relationship a socket shaped mounting structure for the rotary tool to facilitate quick interchangeability of the tools. One form of the tool disclosed is a rotary tiller and another embodiment is a snow blower.

4 Claims, 4 Drawing Figures

LAWNMOWER POWERED IMPLEMENT

This invention relates to implements, and more particularly to an implement which utilizes the power from a lawnmower for operating the implement to perform unrelated tasks such as soil tilling and snow removal.

Lawnmowers are commonly powered by relatively small, gasoline engines and it is well known to utilize such engines to power other similar equipment such as rotary garden tillers, snow blowers and the like. Conventionally each such implement is equipped with its own individual engine which remains idle when the implement is not in use.

A vast number of homeowners are faced with a variety of tasks, the performance of which is facilitated by the use of relatively small, specialized equipment particularly adapted for a particular job. Most homeowners have power operated lawnmowers for cutting grass during the growing season. Many with gardens also have powered rotary tillers for tilling the soil in preparation for planting. A large number who live in climates where snowfall is likely to occur also find it desirable to have power operated snow blower machines for clearing sidewalks and driveways during winter months.

The requirement for such specialized equipment has frequently dictated that each household have a number of individually powered machines of this general type, many of which are utilized rather infrequently. The individual power sources or engines are idle much of the time. This constitutes a waste which should be avoided if possible.

While it is theoretically possible to have a single removable engine which might be transferred from one implement to another to power the respective machines, this has not proven practical for a number of reasons. The engines are often unwieldly and difficult to install and remove. The particular mounting requirements for a given implement may render the mounting structure of the engine difficult to adopt to another implement. The arrangement by which the power is taken from the engine may vary substantially from one implement to the next, making substantial remodeling a pre-requisite to power source interchangeability. As a result, the homeowner who requires specialized equipment of this nature has had little alternative to making relatively large investments in a variety of machines to perform the various tasks.

In order to reduce the investment and expense involved in the maintenance of machines for such tasks, it is a primary object of the present invention to present a single machine which may utilize the power source from a conventional lawnmower to perform a variety of specialized tasks.

It is another object of the invention to provide such an implement wherein the application of the lawnmower power source to various specialized tools may be quickly and easily made by relatively inexperienced persons.

Still a further object of the invention is to provide such an implement wherein the lawnmower may be readily and easily returned to its primary condition when it is no longer being used for the specialized task.

Another object of the present invention is to provide a lawnmower powered implement designed to permit ready conversion for the performance of different specialized tasks so that the implement presents a versatile and convenient tool without requiring a separate power plant or additional power plants for each task which it is capable of performing.

These and other important objects of the instant invention will be further explained or will become apparent from the following description or explanation of the drawings, wherein.

Figure 1:
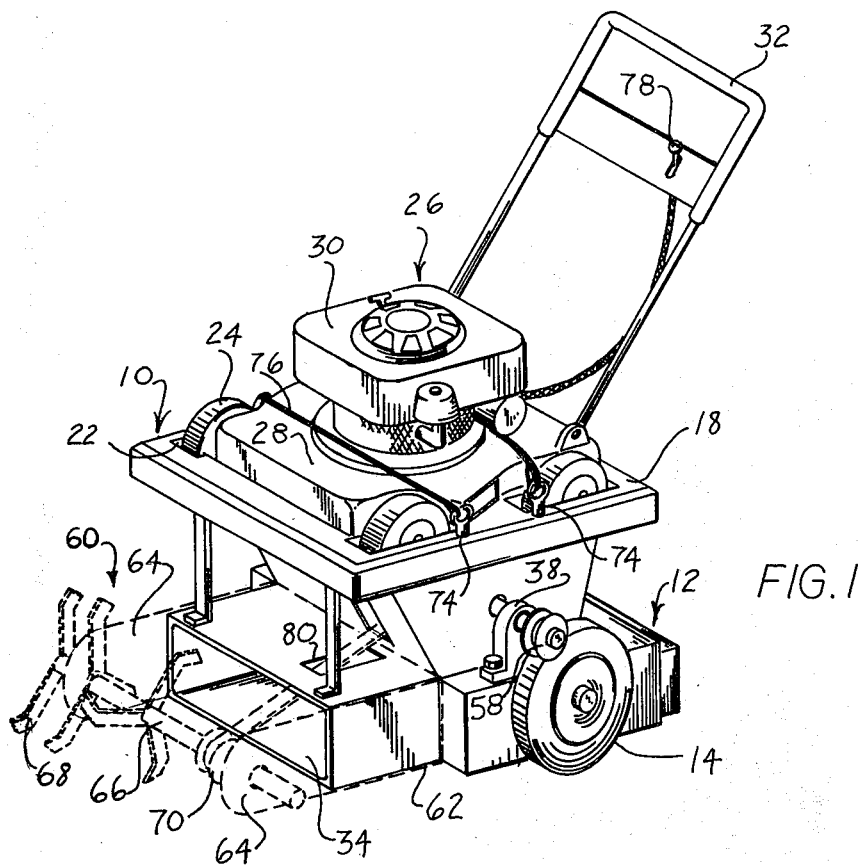
FIG. 1 is a front perspective view of an implement constructed pursuant to the principles of this invention showing a lawnmower in position to provide power thereto, one form of tool appearing thereon fragmentarily in phantom to show the relationship of parts.

An implement embodying the principles of this invention is broadly designated by the reference numeral 10 and includes a main frame 12 supported for transport by a pair of wheels 14 journalled on a transversely extending axle 16. A generally horizontally extending platform 18 is carried by frame 12 in a vertically spaced apart, superposed position above frame 12 by means of uprights 20 extending between the frame and platform.

A plurality of recesses 22 are provided in platform 18 and are configured to receive therein the wheels 24 of a conventional lawnmower 26. The lawnmower may be of usual construction having a housing or support 28 carried by the wheels 24 and upon which is mounted a power source 30 in the nature of an internal combustion engine. The lawnmower handle 32 is secured to support 28 and projects upwardly and outwardly therefrom as shown best in FIG. 1 of the drawing.

A projection 34 of generally rectangular configuration is integral with and projects forwardly from frame 12 for a purpose to be described hereinafter. Frame 12 also supports a horizontally extending drive shaft 36 carried by pillow blocks 38 attached to frame 12 with the shaft extending laterally of implement 10. A bevel gear 40 on the innermost end of shaft 36 is meshed with a similar gear 42 carried at the lowermost end of a vertically extending shaft 44. The latter is mounted for rotation in a bearing 46 formed in platform 18 with shaft 44 extending vertically through the platform. The uppermost end of shaft 44 rotatably receives a sleeve coupler 48 free to rotate on the shaft but the shaft and coupler are provided with holes extending transversely therethrough which may be aligned to receive a pin 50 to lock coupler 48 against rotation relative to shaft 44. The upper end of coupler 48 is internally threaded and adapted to be threadably received on the lowermost end of the vertically extending power shaft 52 of lawnmower 26 as shown best in FIG. 3. Here again, the lwwnmower shaft may be provided with a transversely extending hole which is alignable with a similar hole in coupler 48 to receive a pin 54 for locking shaft 52 and coupler 48 against relative rotation.

From the construction just described it will be apparent to those skilled in the art that the power from shaft 52 of the lawnmower may be transmitted through gears 40 and 42 to shaft 36. A pair of sheaves 56 and 58 are keyed to shaft 36 for rotation therewith as will be hereinafter described.

Referring now particularly to FIG. 1 of the drawing, a rotary tiller tool 60 is provided with generally rectangularly shaped box-like structure in the nature of a socket 62 configured to be complementally received over projection 34 of implement 10 in telescoped relationship with the latter. Extensions 64 of the side panels of socket 62 journal a transversely extending shaft 66 upon which are carried the radially extending ground engageable tillage elements 68 as is conventional for tools of this type. A sheave 70 rigidly secured to shaft 66 is aligned with sheave 66 of shaft 36 so that a drive belt 72 trained over the aligned sheaves provides rotary power to shaft 66 to rotate elements 68.

A pair of spaced apart fasteners 74 such as eye-bolts or the like are provided on each side of platform 18 as illustrated best in FIG. 1 of the drawing. Elongated flexible strap elements 76 extend transversely across the platform between aligned pairs of fasteners 74 as shown best in FIG. 1 of the drawing. Elements 76 are adapted to extend transversely across lawnmower 26 when the latter is on platform 18 to hold the lawnmower down with its wheels in recesses 22 so that the lawnmower remains in a substantially fixed position relative to implement 10 during use of the implement.

Figure 3:
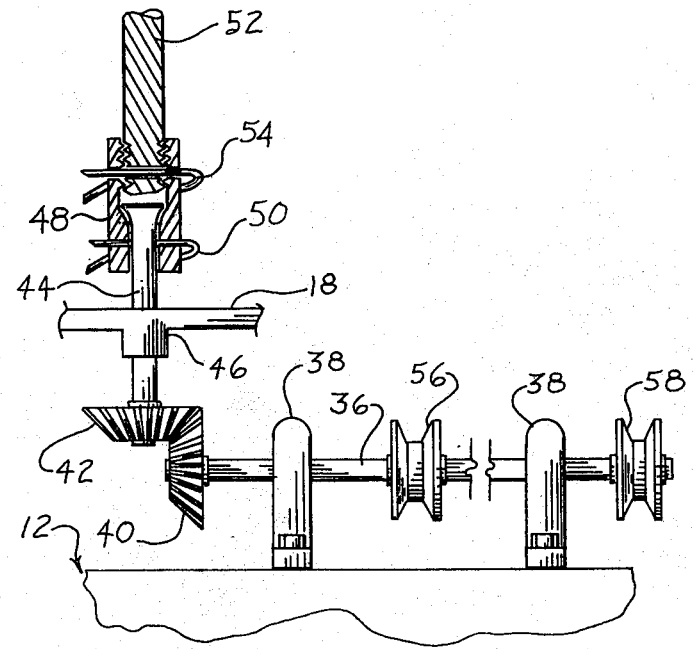
FIG. 3 is an enlarged, fragmentary, detailed cross-sectional view taken along line 3—3 of FIG. 2.

In operation, the blade of lawnmower 26 is removed and the lawnmower is placed on platform 18 in the position shown in FIG. 1. It is secured in this position by elements 76 and coupler 48 is threadably attached to the lawnmower shaft and keyed against relative rotation by pin 50. It may be unnecessary to utilize pin 54 to key the coupler to the shaft for many lawnmower constructions because the engagement will be such that relative rotations cannot occur. However, if a positive lock is desired, or if it is required to prevent relative rotation due to the nature of the shaft of the particular lawnmower involved, the shaft can be bored to receive pin 54 as a safety lock as shown in FIG. 3 of the drawing. Once lawnmower 26 is installed in its operating position, its engine is energized to provide the power through the power take off of implement 10 comprising shafts 44 and 36 respectively. Thus the lawnmower engine 30 drives shaft 66 to cause elements 68 to rotate for tilling the soil as is conventional. The lawnmower handle 32 may be utilized for guiding and moving implement 10 as required. The lawnmower control 78 is conveniently available for operator access to adjust the speed of the engine as necessary. Once the tilling operation has been accomplished, it is, of course, a simple matter to release coupler 48 and elements 76 so that the lawnmower is returned for its primary task of grass cutting.

It will be readily apparent to those skilled in the art that tool 60 may be releasably attached in its telescoped relationship over projection 34 by suitable bolts (not shown) or the like. Further, if it is found that additional support is required for tool 60 because of its cantilevered position projecting forwardly from the implement, quickly attachable braces (not shown) may be provided to extend from socket 62 upwardly to platform 18 for this purpose. Aligned holes 80 in both projection 34 and socket 62 permit the passage of belt 72 to rotate the tillage elements.

Figure 2:
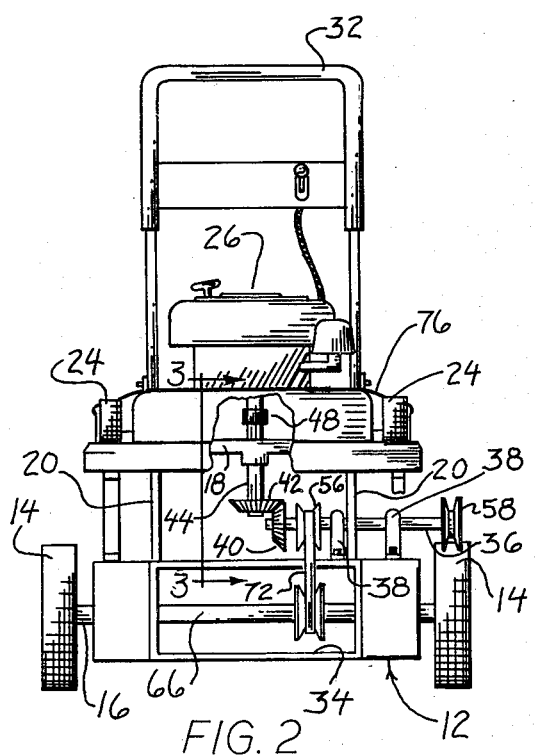
FIG. 2 is a front elevational view thereof, parts broken away to reveal details of construction.
Figure 4:
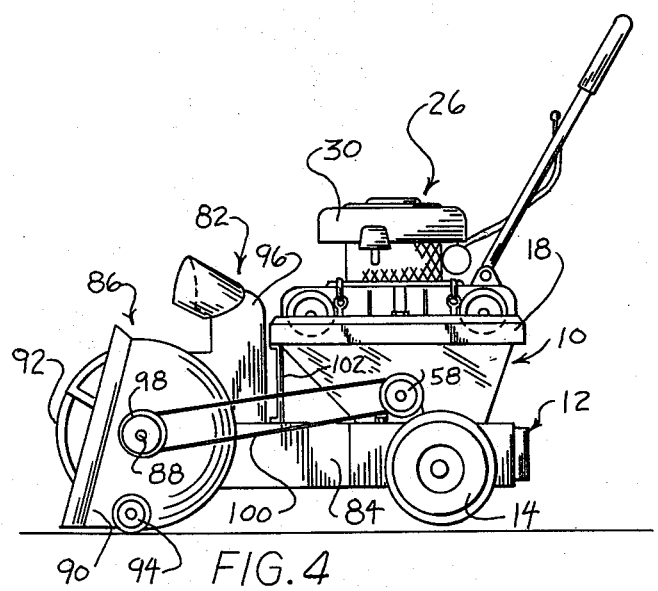
FIG. 4 is a side elevational view of the implement of this invention equipped with a snow blower attachment and showing a lawnmower in position to power the implement.

It is contemplated that tools other than the rotary tiller of FIGS. 1 and 2 will be accommodated by implement 10. A snow blower tool 82 is illustrated in FIG. 4 of the drawing and includes a rectangularly shaped socket structure 84 which may be substantially identical to socket 62 of tool 60. Socket 84 is integrally attached to a snow blower apparatus 86 of more or less conventional construction. Apparatus 86 includes a transversely extending shaft 88 journalled in a housing 90 and upon which is carried a snow removal vane 92. Housing 90 is supported by auxiliary wheels 94 and includes snow deflector structure 96 for deflecting the snow to the side of the implement. A sheave 98 carried on one end of shaft 88 outboard of housing 90 is operably connected through a belt 100 to sheave 58 on shaft 36 of implement 10. FIG. 4 illustrates how a brace 102 may be interposed between the socket 84 of tool 82 and platform 18 of implement 10 to provide additional support to the tool if desired. Brace 102 may be quickly and easily bolted in its supporting position and is readily removable to permit interchanging of the tools on the implement.

The operation of implement 10 when equipped with a snow blowing tool is similar to the operation heretofore described with respect to the implement when equipped with the tillage tool. Socket 84 is telescoped over projection 34 of the implement and once the power shaft of the lawnmower is attached to shaft 44 of the implement and belt 100 is in place, the implement may be used for snow removal purposes.

Other tools for other specialized tasks which require operation by a power source may be provided with a socket support structure of the type described with respect to tools 60 and 86 whereupon such tools could be quickly and easily installed on projection 34 of implement 10. The latter is, of course, a highly versatile implement and one which utilizes as a power source the power source already available to most homeowners in the form of the common lawnmower. The unique construction involving a platform having wheel receiving recesses and quickly attachable holddown means permits the lawnmower to be quickly and easily installed for powering the implement yet permits its ready removal for return for its grass cutting function after the specialized task has been completed.

I claim:

1. An implement to be powered by a lawnmower having a support, wheels for maintaining the support in vertically spaced relationship above a supporting surface, a handle projecting upwardly from the support, and a power source having an output shaft extending vertically downwardly through the support, said implement including:
   a rigid frame having a plurality of wheels secured to the frame for transport of the latter;
   a projection integral with the frame and projecting forwardly therefrom;
   a platform mounted on the frame and extending generally horizontally in vertically spaced apart relationship above the frame;
   said platform having a plurality of recesses therein, there being a recess for each lawnmower wheel respectively said recesses beng adapted to receive the lawnmower wheels to dispose the lawnmower in a substantially fixed, predetermined position on the platform with the lawnmower handle projecting upwardly and outwardly from the implement;
   power take-off means carried by the frame and including a laterally extending rotatable shaft mounted generally horizontally on the frame beneath the platform, a rotatable shaft mounted generally vertically on the frame and projecting upwardly through the platform, and gear means interconnecting said vertical and horizontal shafts for rotation together about their respective axes;
   sheave means secured to said horizontal shaft;

socket structure configured to telescope over said frame projection and extending in cantilevered relationship forwardly of the inmplement;

means releasably securing said socket structure on the projection;

a work member mounted on said socket structure for rotation on a horizontal axis, said member including a plurality of work performing elements extending radially outwardly from said axis;

belt means interconnecting said rotatable work means with said sheave means;

coupling means secured to said vertical shaft and adapted to be releasably coupled with the power output shaft of the lawnmower for transmitting the power from said source through the power take-off means to said work member; and hold down means on the platform for releasably securing a lawnmower in said fixed position.

2. The invention of claim 1, wherein said hold down means includes an elongated, flexible element adapted to extend over the lawnmower, and means securing opposite ends of the element to the frame to secure the lawnmower on the platform.

3. The invention of claim 1, wherein said work member includes structure for tilling the soil.

4. The invention of claim 1, wherein said work member includes snow blower apparatus.

* * * * *